Dec. 29, 1953  F. H. MUELLER ET AL  2,664,262
STOPPER FOR LARGE PIPE LINES
Filed Aug. 24, 1951  5 Sheets-Sheet 1

INVENTORS:
Frank H. Mueller,
John J. Smith,
BY Cushman, Darby & Cushman
ATTORNEYS.

Dec. 29, 1953  F. H. MUELLER ET AL  2,664,262
STOPPER FOR LARGE PIPE LINES
Filed Aug. 24, 1951  5 Sheets-Sheet 3

INVENTORS:
Frank H. Mueller,
John J. Smith,
BY Cushman, Darby & Cushman
ATTORNEYS.

INVENTORS:
Frank H. Mueller,
John J. Smith,
BY Cushman, Darby & Cushman
ATTORNEYS Dec. 29, 1953    F. H. MUELLER ET AL    2,664,262
STOPPER FOR LARGE PIPE LINES
Filed Aug. 24, 1951    5 Sheets-Sheet 5
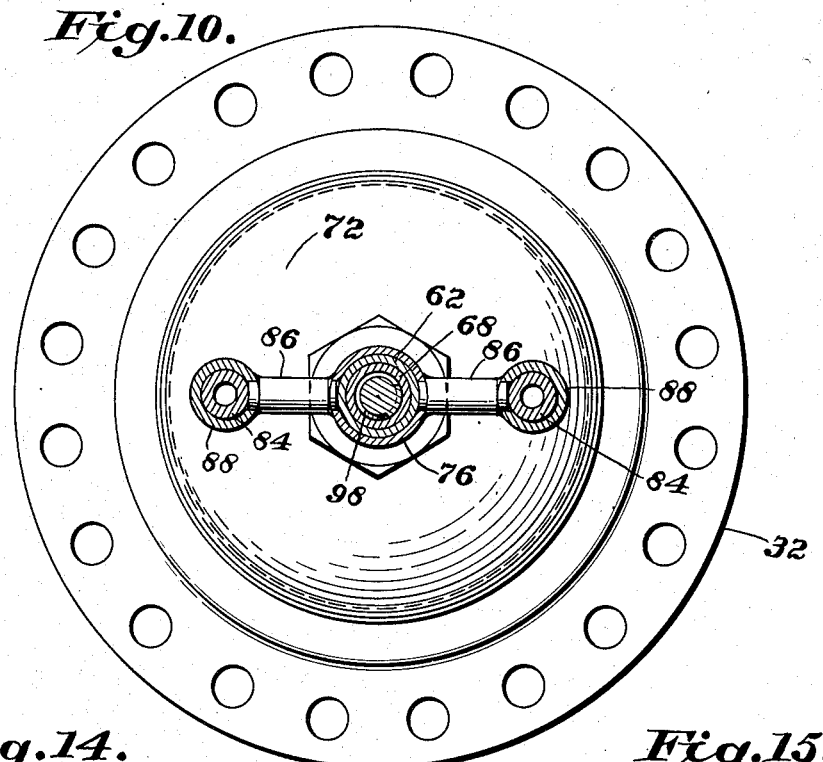
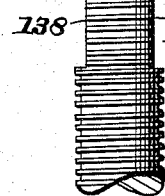
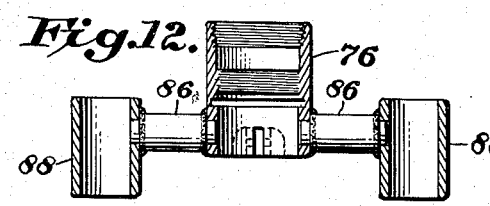
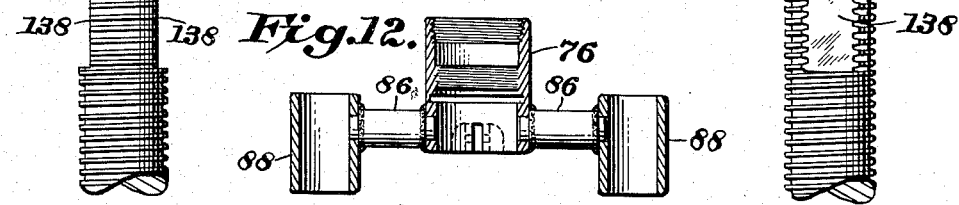
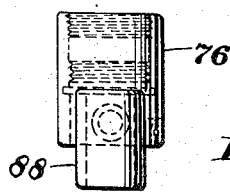
INVENTORS:
Frank H. Mueller,
John J. Smith,
BY Cushman, Darby & Cushman
ATTORNEYS.

Patented Dec. 29, 1953

2,664,262

UNITED STATES PATENT OFFICE

2,664,262

STOPPER FOR LARGE PIPE LINES

Frank H. Mueller and John J. Smith, Decatur, Ill., assignors to Mueller Co., Decatur, Ill., a corporation of Illinois Application August 24, 1951, Serial No. 243,474

8 Claims. (Cl. 251—70)

This invention relates to a pipe stopper of the expanding plug type which is adapted to be inserted into a transverse circular cut-out portion of a pipe and expanded to stop the flow of fluid therethrough. More particularly, this invention relates to mechanism for inserting and positioning an expansible pipe stopper of the type having a side opening therein adapted to be positioned on the upstream side of the line to admit fluid into the stopper and into the stopper bell. Such admission of fluid serves both to assist in expanding the stopper and to permit by-passing of the fluid from the line through the stopper bell and into a by-pass connection. Pipe stoppers of the type with which this invention is concerned, and which employ a longitudinally slotted expansible sleeve for the stopper body are shown and described more in detail in the copending applications of Edgar A. Koenig, Serial No. 638,865, filed January 3, 1946, now abandoned, John J. Smith, Serial No. 236,108, filed July 11, 1951, now Patent No. 2,655,339 and of Frank H. Mueller and John J. Smith, Serial No. 237,556, filed July 19, 1951.

The stoppers disclosed in the aforementioned copending applications comprise a longitudinally slit flexible cylindrical sleeve having a pair of frusto-conical wedging elements disposed on the interior thereof. These elements cooperate with complementary tapered surfaces on the sleeve for a mutual wedging action that is effective to expand the sleeve into sealing relationship with the edges of the cut-out portion of the pipe. Opposite axial movement of the conical members is accomplished by mounting them on a jackscrew having two sets of threads of opposite pitch. An extension of the jackscrew, or expanding rod, extends through the top of the stopper bell for rotation by a hand wheel, or other suitable rotating means, to expand or to permit contraction of the split sleeve. In stopping position, the slot in the side of the sleeve is presented to the upstream side of the line so that fluid entering the slot will assist in expanding the sleeve and also flow through the stopper and into the bell. Obviously, a suitable connection to the bell will then serve to by-pass fluid from the line to any desired point. In order to correctly orient the sleeve with the slot positioned on the upstream side of the line, an orienting tube is connected to the stopper body concentrically over the expanding rod and extends through the closed end of the bell for connection to appropriate positioning means. Additionally, the orienting tube serves as a means for holding the stopper body against rotation while the expanding wedges are operated to either expand or permit contraction of the sleeve.

Insertion and withdrawal of the stopper into and from the line and orientation within the latter can be effectively accomplished by the operating mechanism shown in the aforementioned copending applications. With larger sizes of stoppers, however, and particularly those employed with high pressure lines, it becomes increasingly difficult to manually force the stopper out of the bell and into the line against line pressure. Additionally, in large or high pressure lines, it is difficult to hold the stopper in the line while rotating the expanding rod to expand the stopper into sealing engagement with the edges of the cut-out portion of the line.

It is, therefore, an object of this invention to provide an improved inserting and positioning mechanism for an expansible pipe stopper adapted for use with large or high pressure lines and also which has a side opening therein for positioning on the upstream side of the line.

It is another object of this invention to provide an improved inserting mechanism for a pipe stopper of the type described which provides a mechanical advantage for the operator in effecting axial movement of the stopper into the line.

It is still another object of this invention to provide a pipe stopper of the type described with screw means for jacking the stopper out of the bell and into the line against a high stopper-ejecting force, such screw means being also operable to rotate the expanding rod in order to expand the stopper into sealing engagement with the edges of the cut-out portion of the line.

It is still another object of this invention to provide a pipe stopper of the type described with a jackscrew for forcing the stopper into the line and with shiftable clutch means for employing the jackscrew either to effect axial movement of the stopper or rotary movement of the expanding rod when the stopper is in the line in order to expand or permit contraction of the stopper.

It is a further object of this invention to provide improved inserting and orienting mechanism for a pipe line stopper of the type under consideration that is particularly adapted for use with large and/or high pressure pipe lines.

Other objects and advantages of the invention will be evident from the following description and accompanying drawings, in which:

Figure 10 is a sectional view taken on line 10—10 of Figure 2.

Figure 11 is a sectional view taken on line 11—11 of Figure 3.

Figure 12 is a vertical sectional view of the crosshead assembly for guiding the orienting tube of the stopper.

Figure 13 is an end view of the assembly shown in Figure 12.

Figures 14 and 15 are fragmentary elevational views, taken at right angles to each other, of a portion of the jackscrew employed for forcing the stopper into a line.

Figure 1:
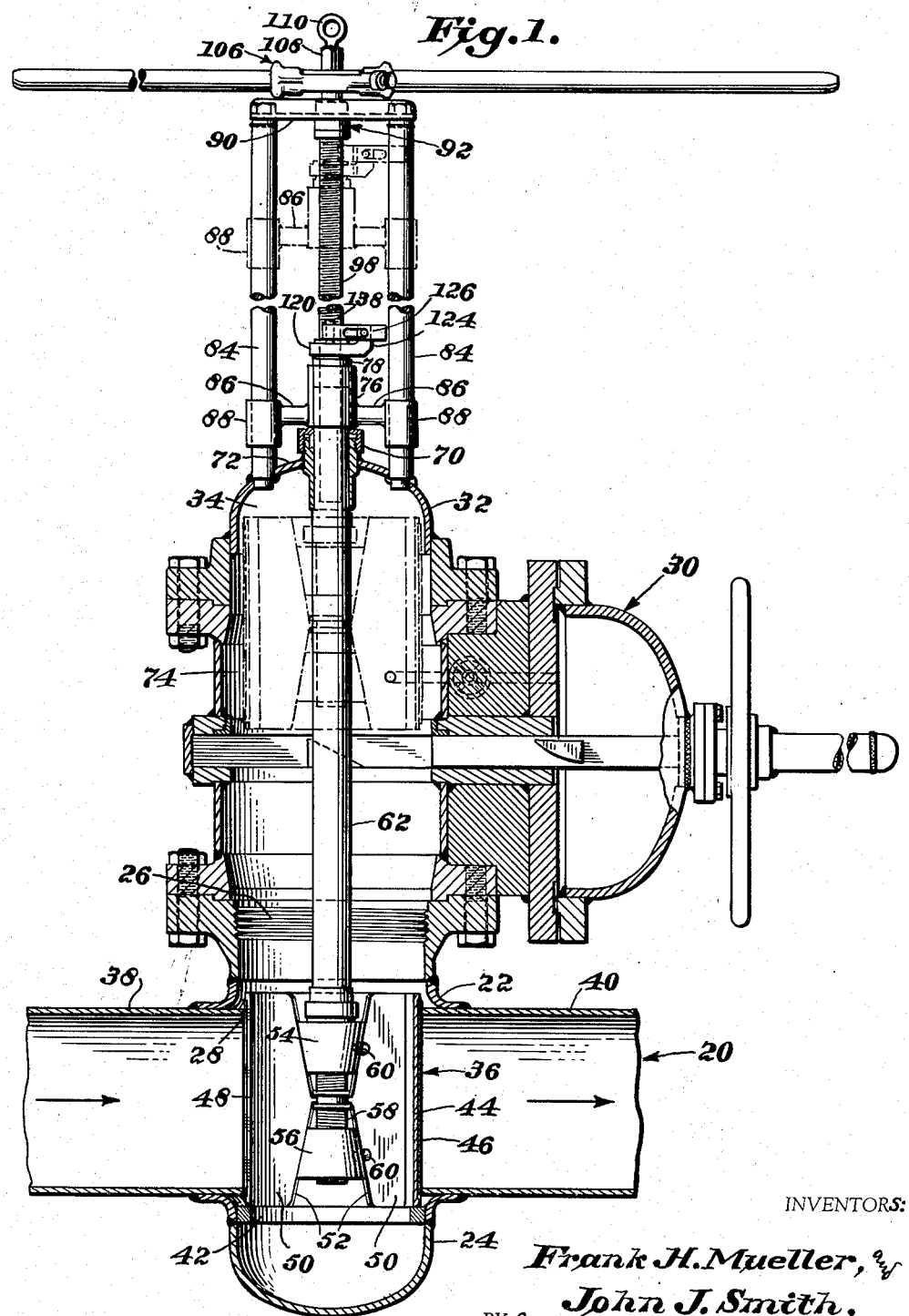
Figure 1 is an elevational view, partly in section, showing a pipe stopper embodying this invention operatively associated, in stopping position, with a line.

Referring now to the drawings, there is shown in Figure 1 a section of a pipe line 20 having conventional upper and lower fittings 22 and 24 for tapping the line, welded or otherwise suitably secured thereto. The upper fitting 22 is provided with a flanged opening 26 disposed in alignment with a transverse circular bore or cut-out 28 previously drilled through the pipe 20, such bore being of a diameter at least slightly greater than the inside diameter of the pipe. Connected to the upper fitting 22 is a control valve 30, usually of the conventional gate type as shown, and secured to the gate valve is a conventional stopper barrel or bell 32 defining an interior pressure chamber 34. The chamber 34 may be provided with a radial outlet port (not shown) similar to and for the same purpose as the pressure chamber ports shown in the aforementioned applications. An expansible pipe stopper 36, of the type with which this invention is concerned, is shown in expanded position within the cut-out portion 28 of the pipe line 20 to stop the flow of fluid from pipe section 38 to pipe section 40. An annular ledge 42 is secured within the lower fitting 24 for engagement with the stopper 36 to properly position the latter axially within the transverse cut-out portion 28 of the pipe.

The stopper comprises a cylindrical sleeve 44, preferably of rather springy material such as sheet steel or the like, having a flexible covering of rubber 46, or other suitable sealing material, to provide an effective seal against the edges of the cut-out portion 28 of the pipe 20. The sleeve 44 is split to form a longitudinal slot 48 and is constructed so that, when relaxed, the sleeve is of slightly smaller exterior diameter than that of the transverse cut-out portion 28 of the pipe. Secured to the inside of the sleeve 44 are a plurality of circumferentially spaced, inwardly extending radial vanes 50, having tapered end portions 52. Engaged with the tapered portions of the vanes 50 are a pair of frusto-conical wedging elements 54 and 56 threadedly mounted on a jackscrew 58. The threads engaging each of the wedging elements 54 and 56 are of opposite pitch, so that, when the wedging elements are held against rotation, rotation of the jackscrew 58 in one direction serves to move the elements toward each other to expand the sleeve 44. Rotation of the jackscrew 58 in the opposite direction obviously serves to relieve the wedging action of the frusto-conical elements 54 and 56 and thereby permit contraction of the sleeve 44 to its normal diameter because of its inherent resilient nature.

A pair of radial pins 60 are mounted on each of the wedging elements 54 and 56 in position to straddle one of the sleeve vanes 50 so that when one of the elements is held against rotation, both the sleeve and the other element are similarly held against rotation. The means for holding one of the wedging elements against rotation consists of an orienting tube 62 which is connected, by a coupling ring 64 (see Figure 3), to an axially extending annular collar 66 on the upper element 54 and has a slot and tooth engagement with the collar for preventing relative rotation therebetween. The tube 62 concentrically encloses the expanding rod, or operating extension 68, of the jackscrew, and both extend upwardly through a suitable packing gland 70 in the closed end 72 of the stopper bell 32 for operation by appropriate exterior means. The construction thus far described is disclosed more in detail in the aforementioned copending applications of John J. Smith and Frank H. Mueller et al. It will be noted in the instant construction, however, that the upper port 74 of the gate valve 30 is of relatively long length so that the stopper 36, in its completely withdrawn position, may be housed partially within such port 74 and partially within the stopper bell 32. Hence, the stopper bell 32 may be relatively shallow in depth.

The projecting end of the orienting tube 62 terminates short of the end of the expanding rod 68 and has a sleeve 76 threaded thereover and preferably keyed thereto, as by an appropriate key element (not shown). The outer end of the sleeve 76 is also interiorly threaded for reception of a gland nut 78 to compress packing 80 interposed between the sleeve and the jackscrew extension 68. When necessary, the contacting smooth surfaces of the sleeve 76 and the tube 62 may be annularly grooved for reception of a suitable O-ring seal 82. Thus, any leakage of line pressure between the sleeve 76 and the tube 62 and between the tube 62 and the jackscrew extension 68 is effectively prevented.

A pair of posts 84 are welded or otherwise suitably secured to the closed end 72 of the stopper bell 32 on opposite sides of the orienting tube 62 and extend upwardly in spaced parallel relation to the latter. The sleeve 76 has a pair of diametrically opposed radial arms 86 welded or otherwise suitably secured thereto. Suitably secured to the end of each arm 86, as by welding, is a sleeve 88 which is mounted for slidable movement on the corresponding upstanding post 84. From this construction it will be seen that the orienting tube 62 is free to move axially with respect to the bell 32, but is maintained against rotation by the post 84 and crosshead guiding arrangement, the crosshead consisting of the sleeve 76, arms 86, and sleeves 88. It will also be noted that such guiding arrangement serves to maintain the stopper 36 in position to present the longitudinal slot 48 therein to the upstream side of the line 20.

Figure 2:
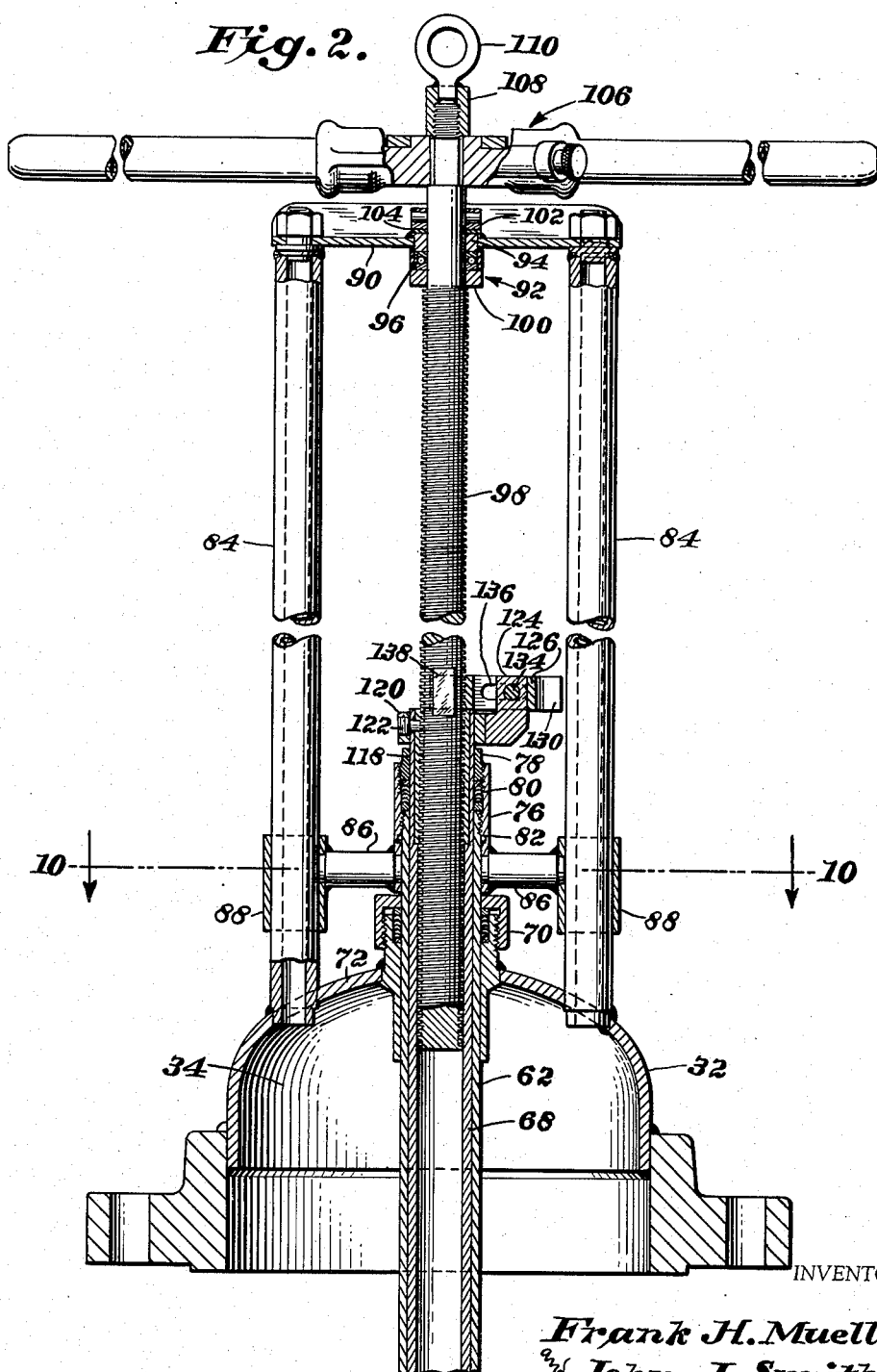
Figure 2 is an enlarged fragmentary view of the inserting and positioning mechanism shown in Figure 1.

A crossbar 90 is bolted or otherwise suitably secured to the upper ends of the posts 84 and carries at its center a thrust bearing assembly 92. This bearing assembly 92, as shown in Figure 2, consists of a bushing 94 welded or otherwise suitably secured in an opening in the crossbar 90 and annularly recessed on its underside for reception of an anti-friction bearing assembly 96. Swivelly carried in the bearing assembly 96 is the reduced upper portion of a jackscrew 98 having a lower shoulder supporting a lower thrust washer or collar 100 which bears against the underside of the anti-friction bearing assembly 96. An upper thrust washer or collar 102 is pinned to the jackscrew 98 and bears against the upper surface of a spacer washer 104 interposed between the upper collar 102 and the bushing 94. The jackscrew 98 may be rotated by a suitably handled ratchet device 106 mounted on the upper end thereof and secured in place by a retaining nut 108 provided with lifting ring 110.

Figure 3:
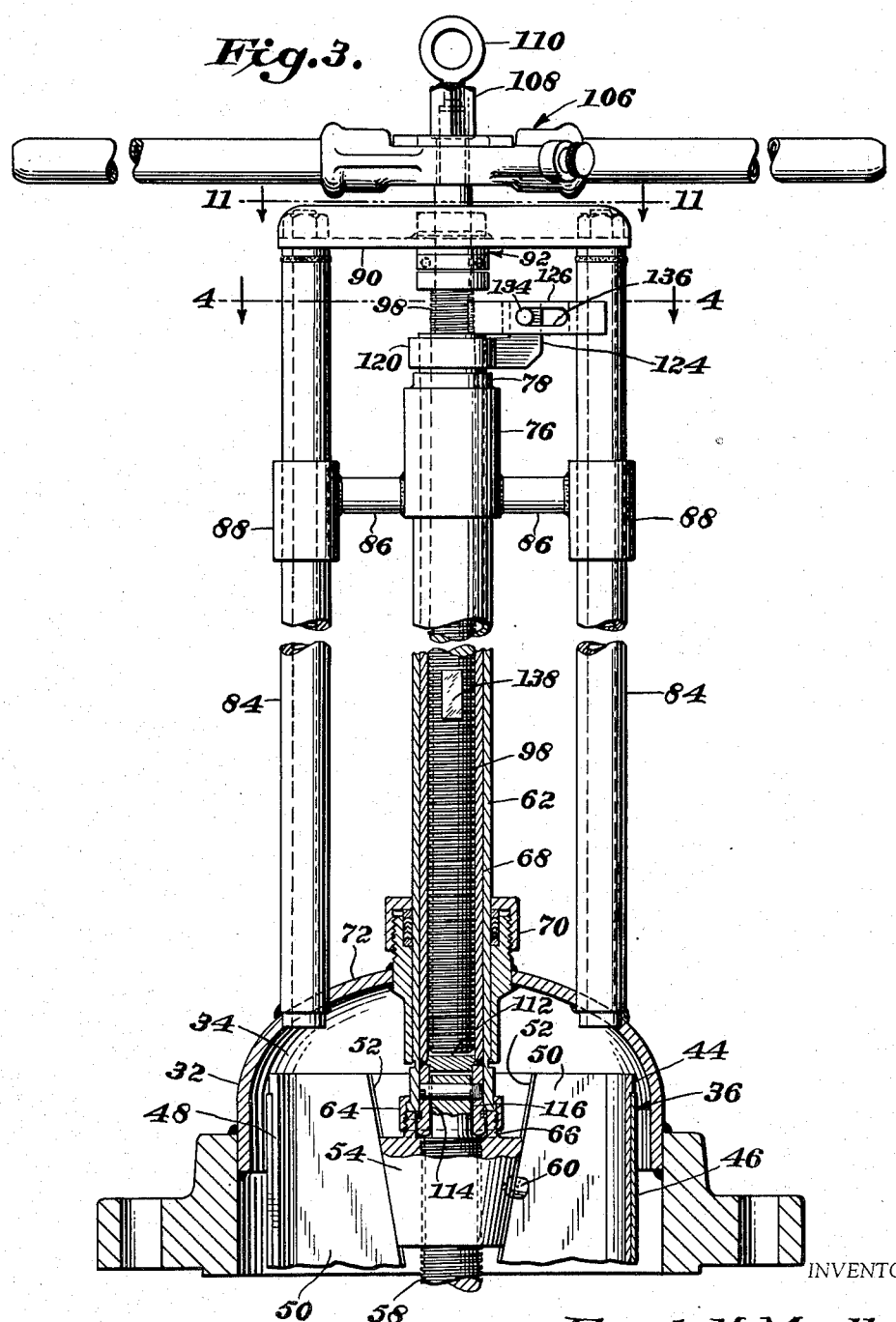
Figure 3 is a view corresponding to Figure 2, but showing the stopper withdrawn from the line into the stopper bell, as shown in dotted lines in Figure 1.
Figure 4:
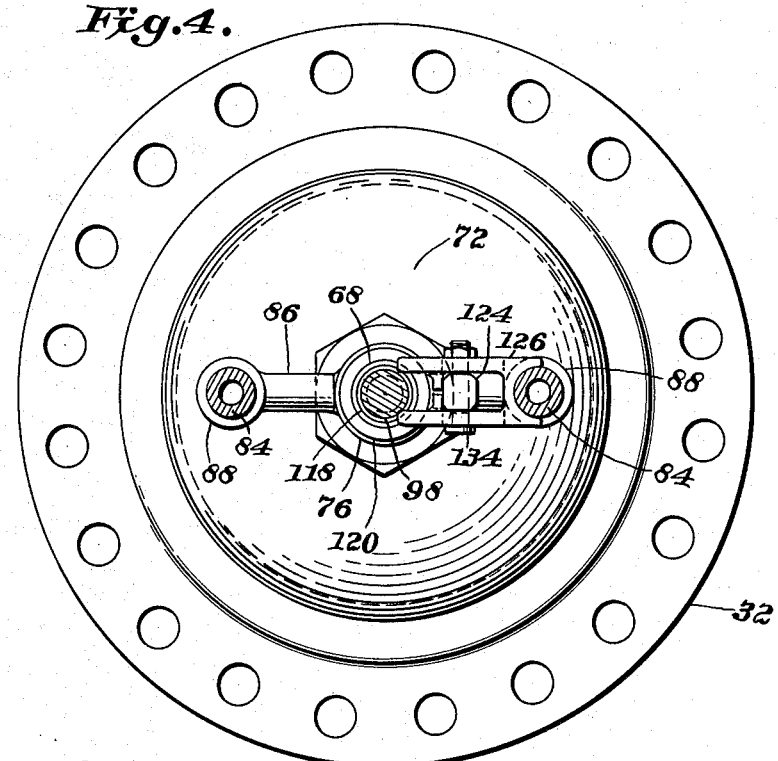
Figure 4 is a sectional view taken on line 4—4 of Figure 3.
Figure 5:
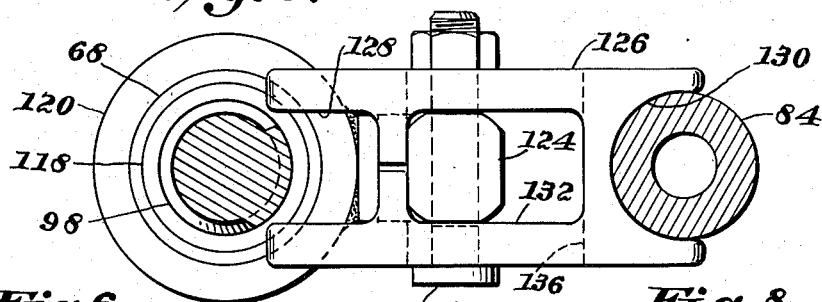
Figure 5 is an enlarged fragmentary view of a portion of Figure 4.
Figure 6:
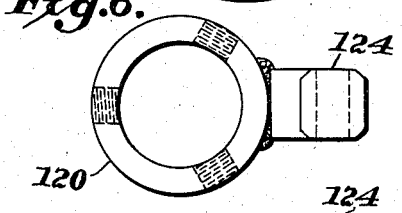
Figures 6 and 7 are plan and elevational views, respectively, of the part for mounting the shiftable clutch element.
Figure 8:
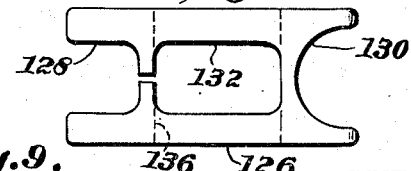
Figures 8 and 9 are plan and end views, respectively, of the shiftable clutch element.
Figure 7:
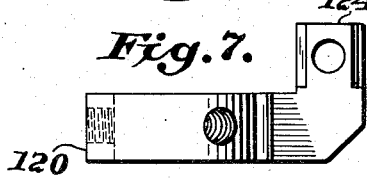
Figure 9:
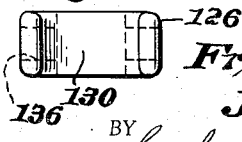

The jackscrew extension or expanding rod 68 is tubular for reception of the jackscew 98 and has a partition 112 adjacent the lower end thereof, thus forming a lower socketed portion 114 for reception of the reduced upper portion 116 of the wedge operating jackscrew 58 which is pinned therein, as shown in Figure 3. The upper portion of the expanding rod 68 is counterbored for reception of an interiorly threaded bushing 118 which engages complementary threads on the jackscrew 98. An annular collar 120 is mounted on the upper end of the expanding rod 68 and secured thereto by set screws 122 which extend through radial apertures in the expanding rod and into radial apertures in the bushing 118. The collar 120 is provided with a radial lug having an axially extending arm or post 124. Mounted on the arm 124 is a clutch element 126 having a pair of forks 128 and 130 at its opposite ends and a cut-out portion 132 through the center thereof which receives the arm 124, as best shown in Figures 5 and 8. A pin 134 extends through the post 124 and through longitudinal side slots 136 (see Figures 2 and 3) in the clutch element 126 to fasten the latter to the post but permit limited movement of the element radially of the jackscrew 98. The outer fork 130 of the clutch element 126 provides an arcuate concavity which is adapted to be engaged against the side of one of the upstanding posts 84 when the clutch element is shifted radially outwardly of the jackscrew 98. The inner fork 128 of the clutch element 126 has substantially parallel sides which are engageable in wrench-like fashion with flats 138 formed on opposite sides of the jackscrew 98 above the gland nut 78.

From this construction it will be seen that when the clutch element 126 is shifted to post engaging position, the expanding rod 68 is held against rotation so that axial movement thereof can be effected by rotation of the jackscrew 98 by the ratchet device 106. It also will be seen that when the stopper 36 has been moved to stopping position within the line 20, the clutch element 126 is aligned with the flats 138 on the lower end of the jackscrew 98. The clutch element 126 then may be shifted so that its inner fork 128 engages such flats 138 and thereby locks the expanding rod 68 to the jackscrew 98 for rotation therewith without axial movement thereby. Hence, further rotation of the jackscrew 98 will expand the sleeve 44 into sealing engagement with the edges of the cut-out portion 28 of the pipe 20.

In operation of the positioning and inserting assembly, after the preliminary operations of tapping the pipe 20, closing the gate valve 30, and detaching the drilling machine (not shown) from the gate valve, the stopper 36 is withdrawn into the bell 32 and the latter then bolted, and/or otherwise suitably secured, in correctly oriented position, on the gate valve, after which the latter may be opened. The ratchet device 106 is then turned to force the stopper 36 out of the bell 32, through the valve 30, and into the transverse bore 28 through the pipe 20, where the stopper is correctly longitudinally positioned by engagement with the ledge 42 in the lower fitting 24. In this position, the shiftable clutch element 126 is aligned with the flats 138 on the sides of the jackscrew 98. The clutch 126 is then shifted to lock its inner fork 128 to the jackscrew 98 and the latter then rotated by the ratchet device 106 to effect rotation of the expanding rod 68 to expand the stopper 36 into sealing engagement with the edges of the cut-out portion 28 of the pipe 20 and stop the flow of fluid from pipe section 38 to pipe section 40. During such expansion, upstream line pressure passes through the slot 48 in the sleeve 44 and acts on the interior of the latter to aid in expanding the same tightly against the cut-out portion of the pipe. Such line pressure also passes upwardly through the sleeve 44, through the valve 30, and into the stopper bell 32, from whence line fluid may be diverted to any suitable location by means of a by-pass connected to a radial port (not shown).

In order to contract the stopper and withdraw the same from the line, the ratchet device is first operated in reverse direction to relieve the wedging effect of the wedging elements 54 and 56 and permit the stopper sleeve 44 to spring back to its original diameter. The clutch device 126 is then shifted radially outwardly to unlock the jackscrew 98 from the expanding rod 68 and to maintain such rod against rotation. Continued rotation of the jackscrew 98 in the reverse direction will then serve to withdraw the stopper out of the pipe 20, through the gate valve 30, and partly into the stopper bell 32. The gate valve may then be closed, and, if no further stopping operations are necessary, the stopper bell may be disconnected and removed from the valve 30.

It will be noted that the clutch element 126 is operable to lock the expanding rod 68 to the jackscrew 98 for rotation therewith only when the stopper 36 is in stopping position within the line. Hence, inadvertent expansion of the stopper in other than stopping position is impossible.

It will thus be seen that the objects of this invention have been fully and effectively accomplished by an improved stopper inserting and orienting mechanism adapted for use with high pressure pipe lines. It will be realized, however, that the specific embodiment used to illustrate this invention is susceptible of various changes and modifications which retain the basic principles of the invention. Therefore, this invention includes all embodiments and modifications encompassed by the spirit and scope of the following claims.

We claim:

1. An inserting and positioning assembly for an expansible pipe line stopper adapted to be inserted into a transverse bore in a line and having a rotatable expanding rod concentrically enclosed by a tube secured against rotation to the stopper body, said assembly comprising: a stopper bell having the tube, and enclosed expanding rod, extending in sealed relation and for axial movement therethrough; fixed guide means on said bell; rigid means fixed against rotation to the outer end of the tube and slidably engaging said guide means for maintaining the stopper against rotation; jackscrew means mounted on said bell and engaging the expanding rod; and shiftable clutch means alternately operable to maintain the expanding rod fixed against rotation for axial movement thereof by rotation of said jackscrew means and to lock the expanding rod to said jackscrew means for rotation therewith without axial movement.

2. The structure defined in claim 1 in which the guide means comprises at least one upstanding post mounted on the closed end of the stopper bell and the rigid means comprises a radial arm having a sleeve on the outer end thereof slidably mounted on said post.

3. The structure defined in claim 1 in which the guide means comprises a pair of upstanding posts mounted on the closed end of the stopper bell on either side of the tube, and including a crossbar secured to said posts and a thrust bearing for the jackscrew means mounted on said crossbar.

4. The structure defined in claim 1 in which the guide means comprises an upstanding yoke-like structure mounted on the closed end of the bell and the outer portion of the expanding rod is tubular and provided with an interior thread for engagement with the jackscrew means, and including a thrust bearing for the jackscrew means supported by said yoke-like structure.

5. The structure defined in claim 1 in which the outer portion of the expanding rod is tubular and provided with an interior thread for engagement with the jackscrew means, and the shiftable clutch means comprises a radial arm mounted on the expanding rod and alternately movable against the guide means for sliding engagement therewith and against said jackscrew means for gripping engagement therewith and rotation thereby.

6. The structure defined in claim 1 in which the outer portion of the expanding rod is tubular and provided with an interior thread for engagement with the jackscrew means, the latter has a pair of flats on opposite sides and adjacent the inner end thereof, and the shiftable clutch means comprises a radial arm secured against rotation to the outer end of the expanding rod and provided with forks at its opposite ends, one of said forks being slidably engageable with the guide means for preventing rotation of the rod and the other grippingly engageable with said flats for effecting rotation of the rod by said jackscrew means.

7. Apparatus for effecting successive axial and rotary movements of a rod-like element comprising: a fixed support, a rod-like element mounted for axial and rotary movement on said support, one end of said element being tubular and provided with an interior thread; a jackscrew swivelly mounted on said fixed support and engaging said interior thread; guide means mounted on said fixed support and extending parallel to said element; and shiftable clutch means mounted on said element and alternately slidably engageable with said guide means for preventing rotation of said element and grippingly engageable with said jackscrew for effecting rotation of said element therewith without axial movement.

8. A pipe stopper assembly comprising: a stopper body for insertion into a transverse bore in a line and including a longitudinally-slotted expansible sleeve, wedge means for expanding said sleeve, and rotatable means for operating said wedge means; a stopper bell; an expanding rod connected to said rotatable means; a tube concentrically enclosing said expanding rod and connected against rotation to said stopper body, said tube and rod extending in sealed relationship and for axial movement through said bell; fixed guide means on said bell; rigid means secured against rotation to the outer end of said tube and slidably engaging said guide means for maintaining said stopper body both in angular position to present the slot in said sleeve to one side of the line and fixed against rotation; jackscrew means mounted on said bell and engaging said expanding rod; and shiftable clutch means mounted on said rod and alternately operable to slidably engage said guide means to maintain said rod fixed against rotation during axial movement by said jackscrew means and to grippingly engage said jackscrew means for rotating said rod therewith without axial movement.

FRANK H. MUELLER.
JOHN J. SMITH.

References Cited in the file of this patent

UNITED STATES PATENTS

| Number | Name | Date |
|---|---|---|
| 880,674 | Ladd | Mar. 3, 1908 |
| 2,237,476 | Cline | Apr. 8, 1941 |
| 2,425,483 | Mueller | Aug. 12, 1947 |